United States Patent
Brückner

(10) Patent No.: US 6,401,086 B1
(45) Date of Patent: Jun. 4, 2002

(54) METHOD FOR AUTOMATICALLY GENERATING A SUMMARIZED TEXT BY A COMPUTER

(75) Inventor: Thomas Brückner, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/381,180

(22) PCT Filed: Sep. 16, 1999

(86) PCT No.: PCT/DE98/00485
§ 371 (c)(1),
(2), (4) Date: Sep. 16, 1999

(87) PCT Pub. No.: WO98/41930
PCT Pub. Date: Sep. 24, 1998

(30) Foreign Application Priority Data

Mar. 18, 1997 (DE) .......................................... 197 11 284

(51) Int. Cl.$^7$ ............................................. G06F 17/30
(52) U.S. Cl. .................................. 707/4; 707/3; 707/5
(58) Field of Search ..................................... 707/3, 4, 5

(56) References Cited

U.S. PATENT DOCUMENTS

| | | | | | |
|---|---|---|---|---|---|
| 4,965,763 A | * | 10/1990 | Zamora | ...................... | 364/900 |
| 5,317,507 A | * | 5/1994 | Gallant | ................... | 364/419.13 |
| 5,325,298 A | * | 6/1994 | Gallant | .................... | 364/419.9 |
| 5,371,673 A | * | 12/1994 | Fan | ....................... | 364/419.01 |
| 5,604,910 A | * | 2/1997 | Kojima et al. | ............... | 395/800 |
| 5,799,299 A | * | 8/1998 | Fujiwara | .......................... | 707/3 |
| 5,946,648 A | * | 8/1999 | Halstead, Jr. et al. | ............ | 704/9 |
| 5,963,940 A | * | 10/1999 | Liddy et al. | .................... | 707/5 |
| 6,006,221 A | * | 12/1999 | Liddy et al. | .................... | 707/5 |
| 6,026,388 A | * | 2/2000 | Liddy et al. | .................... | 707/4 |
| 6,199,034 B1 | * | 3/2001 | Wical. | ........................... | 704/9 |

FOREIGN PATENT DOCUMENTS

| | | | | |
|---|---|---|---|---|
| EP | 0361464 | * | 4/1990 | |
| EP | 0 751 470 | | 1/1997 | |
| EP | 0751470 | * | 2/1997 | ..................... 17/30 |
| JP | 3 278270 | | 12/1991 | |
| JP | 8 305695 | | 11/1996 | |

OTHER PUBLICATIONS

IBM Technical Bulletin, Method for Automatic Extraction of Relevant Sentences From Texts, Nov. 1990, vol. 33, pp. 338–339.*

* cited by examiner

Primary Examiner—Frantz Coby
(74) Attorney, Agent, or Firm—Staas & Halsey LLP

(57) ABSTRACT

The method enables the sentence-based automatic summarization of a text on a computer. For this purpose, subject-related lexica are used that provide a relevance measure for each word contained therein. Each sentence of the text to be summarized is processed word-by-word, and for each word an individual word frequency, weighted with the relevance measure, is cumulated. For the summarization, the n sentences having the greatest probability that they belong to the summary are assembled, whereby n is a predeterminable reduction measure.

4 Claims, 2 Drawing Sheets

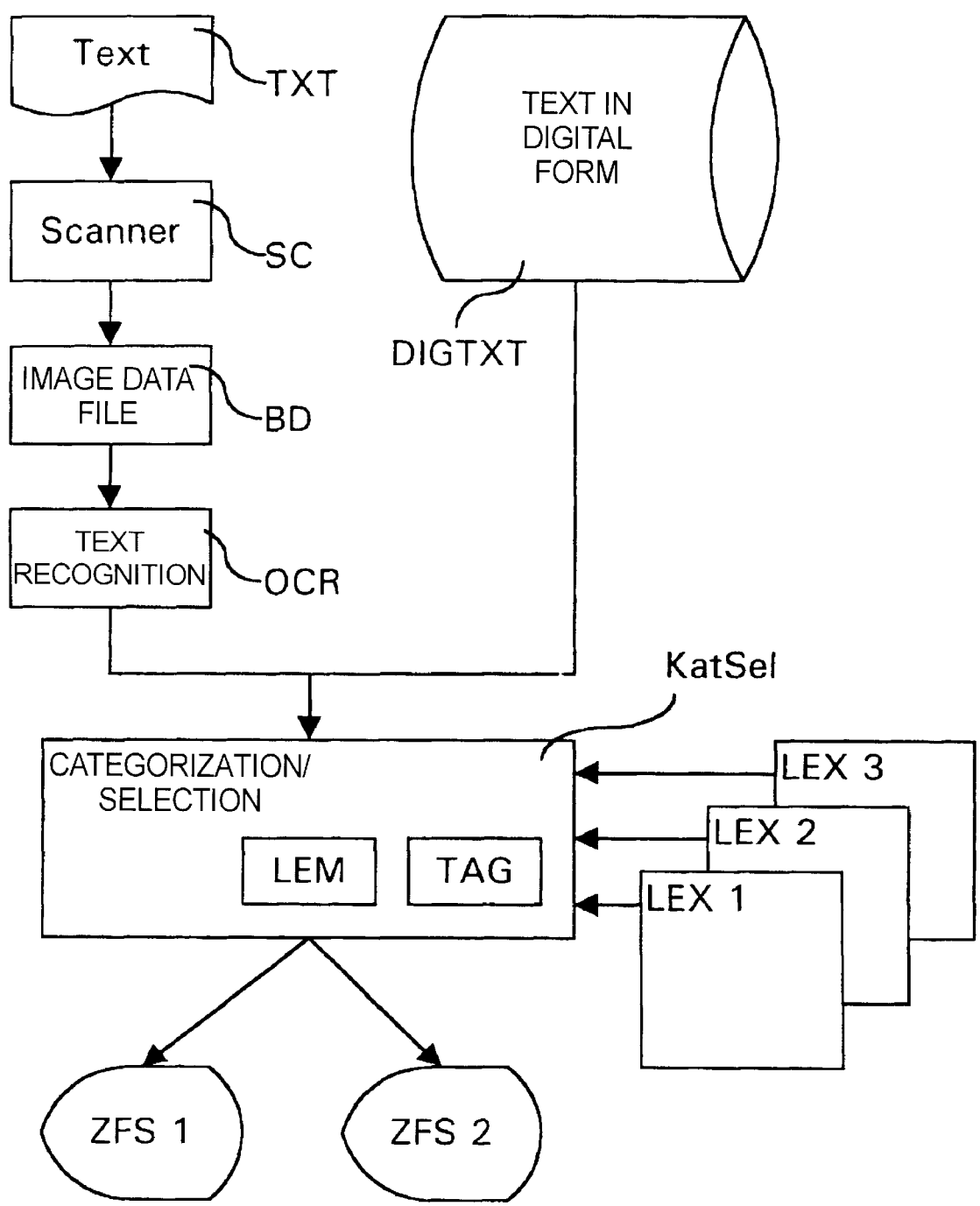

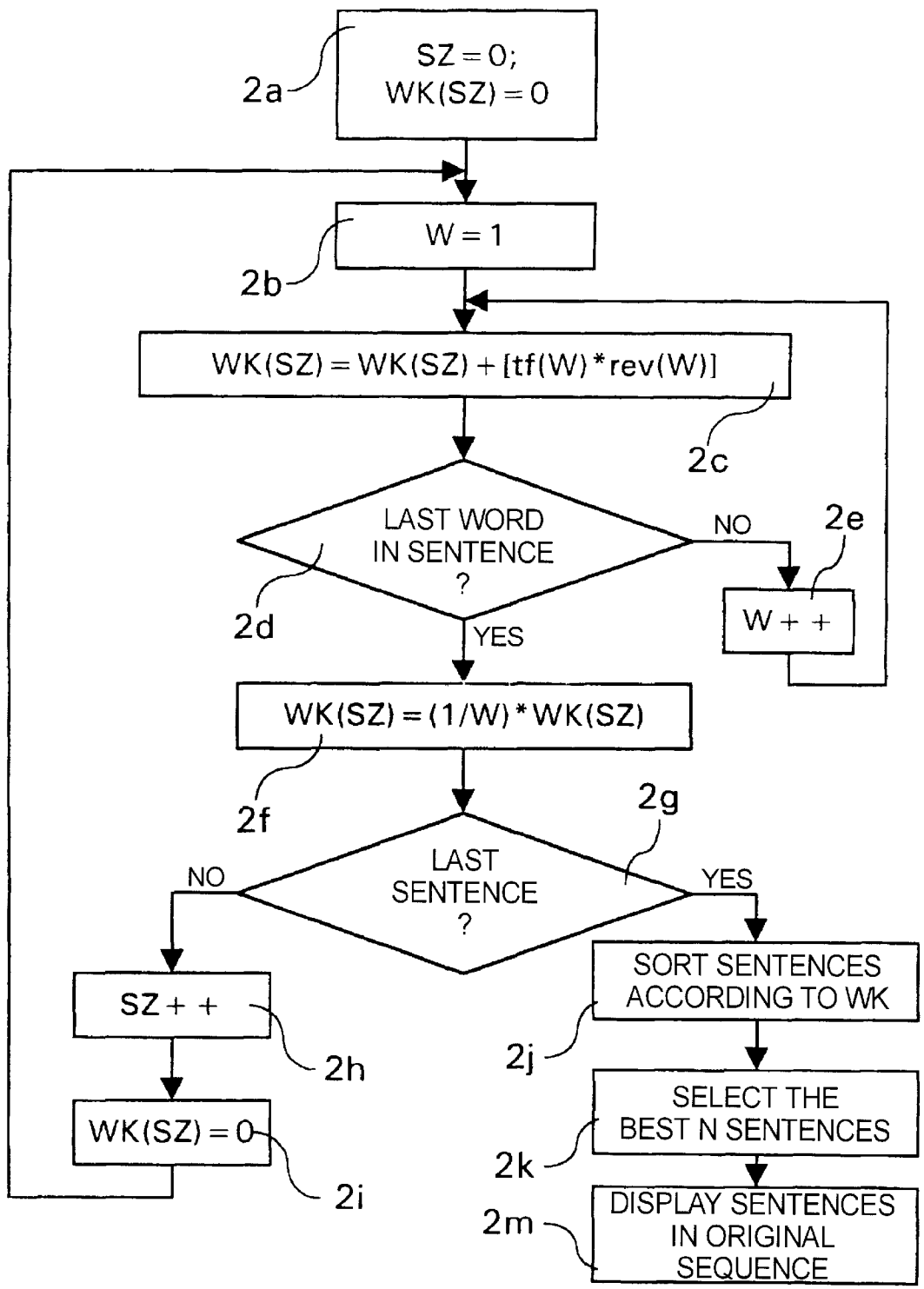

METHOD FOR AUTOMATICALLY GENERATING A SUMMARIZED TEXT BY A COMPUTER

BACKGROUND OF THE INVENTION

1. Field of the Invention

The invention relates to a method for the automatic generation of a summary of a text by means of a computer.

2. Description of the Related Art

From the European Patent document EP 0 751 470 A1, a method for the automatic summarization of a text is known. Feature probabilities are thereby determined that enable an automatic summarization.

Today, it is difficult and strenuous to select, from a flood of information, the information that is important according to predeterminable personal criteria. Even after the selection, a nearly inexhaustible mass of data, e.g. in the form of articles, is often provided. Since with the aid of a computer it is easy to acquire and manage large quantities of data, the idea suggests itself of using the computer also for the preparation or, respectively, for the selection of information. Such an automatic reduction of information should make it possible for a user to have to read a significantly smaller amount of data in order to obtain the information that is relevant for the user.

A particular type of information reduction is the summarization of texts.

From the publication by J. Kupiec, J. Pedersen and F. Chen, "A Trainable Document Summarizer," Xerox, Palo Alto Research Center, 1995, a method is known for the summarization of texts that uses heuristic features with a discrete value range. The probability that a sentence from the text belongs to the summary, under the condition that a heuristic feature has a particular value, is estimated from a training set of summaries.

SUMMARY OF THE INVENTION

An object of the invention is the automatic generation of a summary from a predetermined text, whereby this summary should reproduce in short form the essential content of the text.

This and other objects and advantages of the invention are achieved by a method for the automatic generation of a summary of a text by a computer, in which for each sentence a probability is calculated that the sentence belongs to the summary, in that, for each word in the sentence, the relevance measure is determined from a lexicon that contains application-specific words with a predetermined relevance measure for each of these words, and all relevance measures cumulatively yield the probability that the sentence belongs to the summary; all sentences of the text are sorted according to the probabilities; and corresponding to a predeterminable reduction measure, for the summarization the best sentences are displayed in a sequence given by the text.

The inventive method enables a summarization of a text in that for each sentence of this text a probability that the sentence belongs to the summary is calculated. For each word in the sentence, the relevance measure is determined from a lexicon that contains all relevant words, with a predetermined relevance measure for each of these words. The cumulation of all relevance measures yields the probability that the sentence belongs to the summary. All sentences are thereupon sorted according to their probability. A predeterminable reduction measure that indicates what percentage of the original text is represented in the summary serves for the selection of the number of sentences given by this reduction measure from the sorted representation. If the most important x percent of sentences have been selected, these are displayed as a summary of the text in their original sequence given by this text.

An advantageous development of the inventive method is the introduction of an individual word frequency in addition to the relevance measure. This individual word frequency indicates how often the respectively indicated word occurs in the entire text to be summarized. Taking into account the relevance measure and this newly introduced individual word frequency, the probability that the respective sentence is contained in the summary can be indicated by the following rule:

$$WK_{(sentence)} = \frac{1}{N} \cdot \sum_{i=1}^{N} tf \cdot rlv \quad (1)$$

whereby $WK_{(sentence)}$ is the probability that a sentence belongs to the summary, N is the total number of words that occur in the sentence, i is a count variable (i=1,2, ..., N) for all the words in the sentence, tf is the frequency of the occurrence of the respective word under consideration in the entire text being summarized (individual word frequency), and rlv is the relevance measure for the respective word in the sentence.

Let it be hereby noted that the words occurring in the lexicon with their relevance measure rlv, known from the lexicon, are decisive. If a word that does not occur in the lexicon occurs n times, this word does not increase the probability that the sentence belongs to the summary.

A development of the inventive method is the use of an application-specific lexicon. This has the result that the summary is carried out with a predeterminable subject-matter-specific filter. Thus, for example, a lexicon specified for sport articles will, in a text to be summarized, evaluate sport-related words with a higher relevance than a lexicon that is specialized for summaries of economics contributions. It is thus advantageously possible to provide specific knowledge concerning predeterminable categories by means of lexica corresponding to the respective categories.

In addition, it is advantageous to allocate a text to one or more categories. This can be carried out automatically by using specific predeterminable words in the theme-related lexica as selection criteria for an allocation to the respective subject area. If several categories (subject areas), i.e. various viewpoints or, respectively, filters, are possible for the summarization of a text, different summaries —one for each category—can be produced automatically.

In the present application, the terms application-specific lexicon, subject-related lexicon, and theme-related lexicon are used as alternative terms for the lexicon according to the invention.

BRIEF DESCRIPTION OF THE DRAWINGS

The invention is further explained on the basis of an embodiment shown in the Figures.

FIG. 1 is a functional block diagram which shows a drawing representing a system for the automatic generation of a summary, FIG. 2 shows a block diagram representing the steps of the inventive method.

DETAILED DESCRIPTION OF THE PREFERRED EMBODIMENTS

FIG. 1 shows a system with which an automatic generation of a summarization of a text is carried out by a computer. A text to be summarized can be present either in written form TXT, e.g. on paper, or in digital form DIGTXT, e.g. as the result of a database query.

In order also to be able to process the text in paper form TXT according to the invention, it is necessary to make this text accessible to the computer. For this purpose, the text TXT is read in by the scanner SC and is stored as image data BD. A text recognition software OCR converts the text TXT, present as image data BD, into a machine-readable format, e.g. ASCII format. The digitally existing text DIGTXT is already present in a machine-readable format.

In addition, suppose that a predeterminable number of subject-related lexica, one lexicon per subject area, are available.

In FIG. 1, the subject-related lexica are indicated as blocks LEX1, LEX2 and LEX3. Many types of construction of the contents of the subject-related lexica are conceivable. One possibility is the automatic analysis of categorized texts by selecting word frequencies as a significant criterion for the respective category.

On the basis of the lexica, it is possible automatically to categorize the text to be summarized (in the block KatSel), in that predeterminable words in the subject-related lexica, if they occur in the text to be summarized, are the decisive factor for a summarization with respect to the respectively relevant subject-related lexicon. In such a case, a subject-related summary matching this lexicon is produced.

It is hereby noted that the words in the text to be summarized are advantageously reduced to their respective basic form (this takes place in the block LEM), and each word receives a reference to its part of speech (block TAG).

For each category (subject), the summary according to the invention is produced (in the block KatSel) by means of the corresponding lexicon. Subject-specific summaries ZFS1 and ZFS2 result.

The steps that lead to the summarization of the text are presented in detail in FIG. 2. For clarity, the abbreviations used in FIG. 2 are summarized here:

| | |
|---|---|
| SZ | Sentence |
| WK (SZ) | Probability for sentence SZ |
| W | Word |
| tf (W) | Individual word frequency of the word W (in the sentence SZ) |
| rev (W) | Relevance measure of the word W (in the sentence SZ). |

In step 2a, at the beginning of the inventive method the first sentence is selected and the probability that this sentence belongs to the summary is set equal to 0. In step 2b, the first word of this sentence is selected. Since the probability that this sentence belongs to the summary is composed of the probabilities of the individual words, for each word in the sentence the respective probability is cumulated to form the overall probability for the entire sentence in the loop from step 2c to step 2e. If all words in the sentence have been processed, the probability for the individual sentence is normed by the number of words. The steps described are carried out for all sentences in the text (step 2g, 2h, 2i). If the last sentence in the text has been processed, the sentences are sorted according to their probability (step 2j). Corresponding to a predeterminable reduction measure, in step 2k the n best sentences corresponding to the reduction measure are selected, and subsequently, in step 2m, they are displayed in their original sequence.

Although other modifications and changes may be suggested by those skilled in the art, it is the intention of the inventor to embody within the patent warranted hereon all changes and modifications as reasonably and properly come within the scope of his contribution to the art.

I claim:

1. A method for automatic generation of a summary of a text by a computer, comprising the steps of:

calculating for each sentence a probability that the sentence belongs to the summary, including
determining a relevance measure for each word in the sentence from a lexicon that contains application-specific words with a predetermined relevance measure for each of these words, and
adding together the relevance measures for all words in the sentence to yield the probability that the sentence belongs to the summary, sorting all sentences of the text according to the probabilities, performing a predeterminable reduction measure, displaying as the summary best sentences in a sequence given by the text.

2. A method according to claim 1, further comprising the steps of:

in addition to the relevance measure, determining an individual word frequency for each word, and determining the probability that the sentence is contained in the summary by the following rule:

$$WK_{(sentence)} = \frac{1}{N} \cdot \sum_{i=1}^{N} tf \cdot rlv$$

wherein

WK(sentence) is a probability that a sentence belongs to the summary,

N is a total number of words that occur in the sentence,

I is a count variable (I=1,2, . . . , N) for all the words in the sentence, tf is a frequency of occurrence of the word under consideration in an entire text being summarized, and rlv is a relevance measure for the word in the sentence.

3. A method according to claim 1, further comprising the step of:

allocating the text to at least one category using an application-specific lexicon.

4. A method according to claim 1, further comprising the steps of:

producing for each allocation of the text to a category an application-specific summary.

* * * * *